(12) United States Patent
Siddiqui

(10) Patent No.: US 10,901,466 B2
(45) Date of Patent: Jan. 26, 2021

(54) COMPACT HINGE FOR ELECTRONIC DEVICES

(71) Applicant: Microsoft Technology Licensing, LLC, Redmond, WA (US)

(72) Inventor: Kabir Siddiqui, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/406,316

(22) Filed: May 8, 2019

(65) Prior Publication Data

US 2020/0064890 A1 Feb. 27, 2020

Related U.S. Application Data

(60) Provisional application No. 62/722,633, filed on Aug. 24, 2018.

(51) Int. Cl.

| | |
|---|---|
| *G06F 1/16* | (2006.01) |
| *E05D 11/08* | (2006.01) |
| *F16C 11/04* | (2006.01) |
| *E05D 11/00* | (2006.01) |
| *E05D 3/12* | (2006.01) |
| *E05D 11/10* | (2006.01) |

(52) U.S. Cl.
CPC ........... *G06F 1/1681* (2013.01); *E05D 3/122* (2013.01); *E05D 11/0054* (2013.01); *E05D 11/0081* (2013.01); *E05D 11/082* (2013.01); *E05D 11/105* (2013.01); *F16C 11/04* (2013.01); *G06F 1/1616* (2013.01); *E05Y 2201/218* (2013.01); *E05Y 2201/25* (2013.01); *E05Y 2900/606* (2013.01)

(58) Field of Classification Search
CPC .............................. G06F 1/1681; G06F 1/1683
See application file for complete search history.

(56) References Cited

U.S. PATENT DOCUMENTS

| | | | | |
|---|---|---|---|---|
| 4,490,884 A | * | 1/1985 | Vickers | E05D 11/082 16/338 |
| 5,394,297 A | * | 2/1995 | Toedter | G06F 1/1616 16/386 |
| 5,632,066 A | * | 5/1997 | Huong | G06F 1/1616 16/338 |

(Continued)

FOREIGN PATENT DOCUMENTS

WO  2017111817 A1  6/2017

OTHER PUBLICATIONS

"International Search Report and Written Opinion Issued in PCT Application No. PCT/US2019/038802", dated Sep. 30, 2019, 12 Pages.

*Primary Examiner* — Adrian S Wilson
(74) *Attorney, Agent, or Firm* — Ray Quinney & Nebeker P.C.; Paul N. Taylor

(57) ABSTRACT

A compact hinge includes two body attachments, each body attachment having a torque transfer post. A compressive friction sleeve includes a first torque transfer sleeve and a second torque transfer sleeve. A first torque transfer post is inserted into the first torque transfer sleeve and a second torque transfer post is inserted into the second torque transfer sleeve. A gear set causes the first torque transfer post to rotate with the same rotational angle as the second torque transfer post.

23 Claims, 10 Drawing Sheets

(56) References Cited

U.S. PATENT DOCUMENTS

| | | | | |
|---|---|---|---|---|
| 5,970,580 A * | 10/1999 | Katoh | G06F 1/1681 16/337 |
| 5,987,704 A * | 11/1999 | Tang | G06F 1/1681 16/342 |
| 6,085,388 A * | 7/2000 | Kaneko | G06F 1/1681 16/338 |
| 6,223,393 B1 * | 5/2001 | Knopf | G06F 1/1618 16/366 |
| 6,584,646 B2 * | 7/2003 | Fujita | G06F 1/1616 16/342 |
| 7,414,834 B2 * | 8/2008 | Ukonaho | H04M 1/022 16/354 |
| 7,832,056 B2 * | 11/2010 | Kuwajima | H04M 1/022 16/282 |
| 7,895,711 B2 * | 3/2011 | Shen | G06F 1/1616 16/342 |
| 8,091,179 B2 * | 1/2012 | Wang | G06F 1/1616 16/338 |
| 8,104,144 B2 * | 1/2012 | Wang | G06F 1/1681 16/354 |
| 8,196,263 B2 * | 6/2012 | Wang | G06F 1/1681 16/338 |
| 8,593,800 B2 * | 11/2013 | Asakura | G06F 1/1616 16/235 |
| 9,201,465 B2 * | 12/2015 | Meyers | G06F 1/1681 |
| 9,535,465 B2 * | 1/2017 | Bohn | G06F 1/1681 |
| 9,563,236 B2 * | 2/2017 | Rittenhouse | G06F 1/1683 |
| 9,964,988 B2 * | 5/2018 | Rittenhouse | G06F 1/1616 |
| 10,281,958 B2 * | 5/2019 | Chiang | H03G 7/002 |
| 2001/0016969 A1 | 8/2001 | Fujita | |
| 2005/0239520 A1 * | 10/2005 | Stefansen | H04M 1/0243 455/575.1 |
| 2008/0307608 A1 * | 12/2008 | Goto | G06F 1/1618 16/366 |
| 2009/0056073 A1 * | 3/2009 | Lin | G06F 1/1681 16/235 |
| 2012/0194972 A1 * | 8/2012 | Bohn | H04M 1/0216 361/679.01 |
| 2013/0187525 A1 * | 7/2013 | Chuang | G06F 1/1681 312/326 |
| 2014/0013743 A1 * | 1/2014 | Dane | F01K 23/10 60/615 |
| 2015/0160695 A1 * | 6/2015 | Su | E05D 3/12 16/366 |
| 2015/0184437 A1 * | 7/2015 | Wikander | G06F 1/1618 16/354 |
| 2015/0362958 A1 * | 12/2015 | Shang | G06F 1/1681 361/679.58 |
| 2016/0010375 A1 * | 1/2016 | Rittenhouse | G06F 1/1618 361/679.27 |
| 2018/0046227 A1 | 2/2018 | Tazbaz | |
| 2019/0155344 A1 * | 5/2019 | Lin | G06F 1/1618 |
| 2019/0169896 A1 * | 6/2019 | Regimbal | G06F 1/1683 |
| 2019/0243426 A1 * | 8/2019 | Morrison | E05D 11/0054 |
| 2019/0346889 A1 * | 11/2019 | Chen | G06F 1/1652 |

\* cited by examiner

COMPACT HINGE FOR ELECTRONIC DEVICES

CROSS-REFERENCE TO RELATED APPLICATIONS

This is a non-provisional patent application claiming priority to and benefit of U.S. Provisional Patent Application Ser. No. 62/722,633, filed on Sep. 24, 2018, and entitled "Compact Hinge for Electronic Devices," which is hereby incorporated by reference in its entirety for all intents and purposes by this reference.

BACKGROUND

Background and Relevant Art

Use of computing devices is becoming more ubiquitous by the day. Computing devices range from standard desktop computers to wearable computing technology and beyond. Consumer demand and improved technology continue to reduce the size of computing devices. To accommodate a smaller size, computing devices may bend, fold, or otherwise rotate one portion of a computing device relative to another portion of the computing device.

The subject matter claimed herein is not limited to implementations that solve any disadvantages or that operate only in environments such as those described above. Rather, this background is only provided to illustrate one exemplary technology area where some implementations described herein may be practiced.

BRIEF SUMMARY

In one implementation, a compact hinge includes a first body attachment and a second body attachment. A first torque transfer post is connected to the first body attachment and a second torque transfer post is connected to the second body attachment. A compressive friction sleeve includes a first torque transfer sleeve and a second torque transfer sleeve. The first torque transfer post is inserted into the first torque transfer sleeve and the second torque transfer post is inserted into the second torque transfer sleeve.

In another implementation, a method for adjusting the torque of a hinge includes inserting a first torque transfer post into a first torque transfer sleeve of a compressive friction sleeve and a second torque transfer post into a second torque transfer sleeve of the compressive friction sleeve. A net torque is generated by rotating the torque transfer posts within the compressive friction sleeve.

In still another implementation, a compact hinge includes a first body attachment, the first body attachment including a first torque transfer post and a first gear integrally formed with the first torque transfer post. A second body attachment includes a second torque transfer post and a second gear integrally formed with the second torque transfer post. A compressive friction sleeve includes a first torque transfer sleeve, the first torque transfer post being inserted into the first torque transfer sleeve. The compressive friction sleeve further includes a second torque transfer sleeve, the second torque transfer post being inserted into the second torque transfer sleeve. A first transfer gear is mechanically connected to the first gear. A second transfer gear is mechanically connected to the first transfer gear and the second gear.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims, or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

This disclosure generally relates to hinge apparatuses, systems, and methods. More particularly, this disclosure generally relates to hinge apparatuses, systems, and methods for rotating computing devices.

Figure 1:
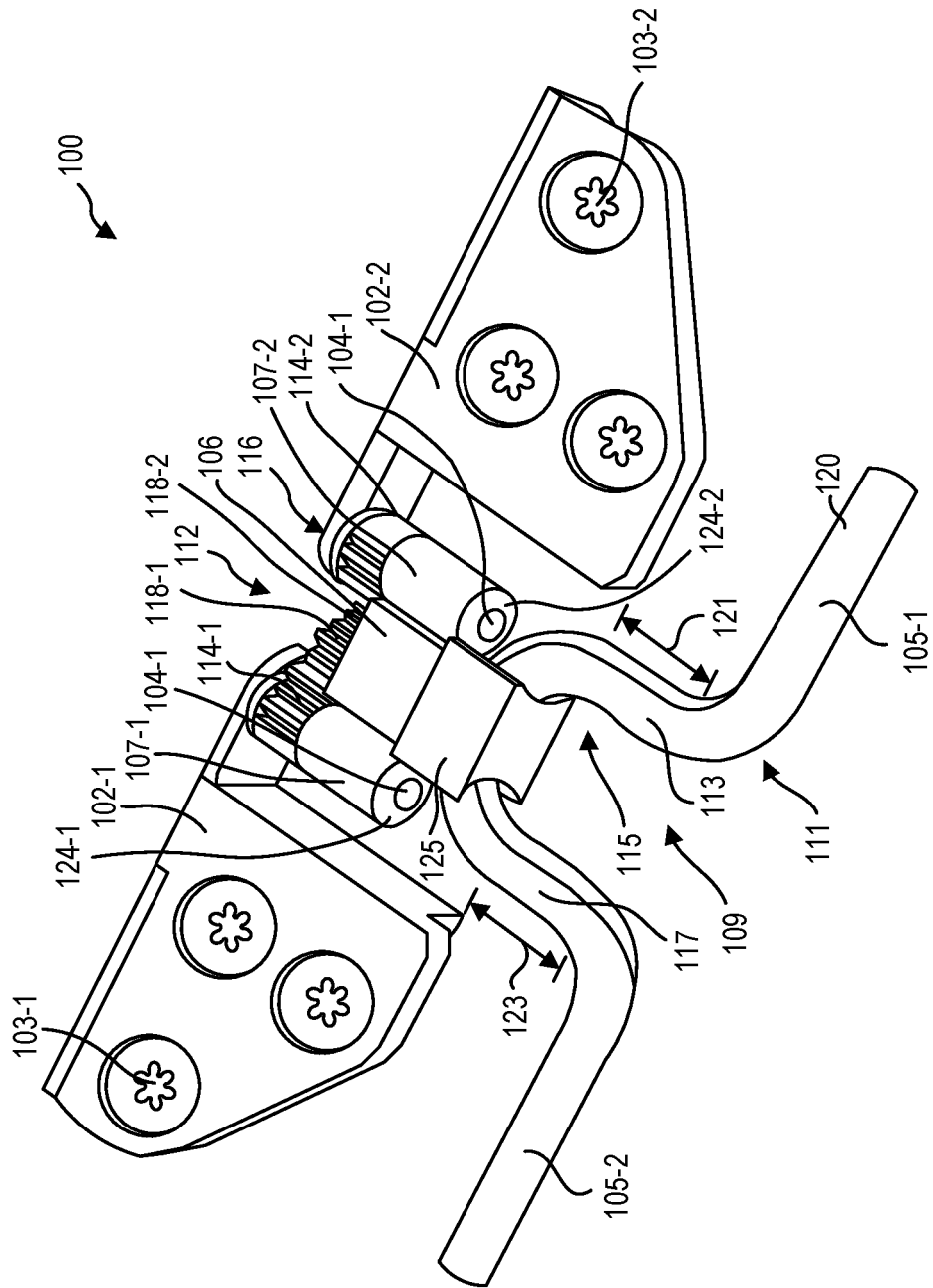
FIG. 1 is a perspective view of a compact hinge, according to at least one implementation of the present disclosure.

In at least one implementation a compact hinge may provide torque control for a foldable electronic device. FIG. 1 is an isometric view of a representation of a compact hinge 100, according to at least one implementation of the present disclosure. The compact hinge 100 may include a first body attachment 102-1 and a second body attachment 102-2. In some implementations, the first body attachment 102-1 may be connected to a display of a computing device with a first set of fasteners 103-1. The display may be any type of display, such as an LCD, LED, OLED, cathode ray tube, a touch-sensitive display, any other display, or combinations thereof. The second body attachment 102-2 may be connected to an input device with a second set of fasteners 103-2. The input device may include a keyboard, a touchpad, a mouse, one or more buttons, other input devices, or combinations thereof that may be used to provide input to a computing device. In some implementations, the first body attachment 102-1 and/or the second body attachment 102-2 may be connected to both a display and an input device. In some implementations, the first body attachment 102-1 and/or the second body attachment 102-2 may be connected to a processor or a housing for a processor.

The first body attachment 102-1 and the second body attachment 102-2 may each include a torque transfer post 104-1, 104-2. In at least one implementation, the body attachments 102-1, 102-2 may be integrally formed with the torque transfer posts 104-1, 104-2. In other words, the body attachments 102-1, 102-2 may be formed of a single unitary piece, without any mechanical, welded, or adhesive connection. In other implementations, torque transfer posts 104-1, 104-2 may be connected to the body attachments 102-1, 102-2. In other words, the torque transfer posts 104-1, 104-2 may be welded, glued, mechanically fastened, screwed into, or otherwise connected or fastened to the body attachments 102-1, 102-2.

The compact hinge 100 may further include a compressive friction sleeve 106. The compressive friction sleeve 106 may include a first torque transfer sleeve 107-1 and a second torque transfer sleeve 107-2. The torque transfer sleeves 107-1, 107-2 may include a central bore, through which the torque transfer posts 104-1, 104-2 may be inserted. Thus, the first torque transfer post 104-1 may be inserted into the first torque transfer sleeve 107-1 and the second torque transfer post 104-2 may be inserted into the second torque transfer sleeve 107-2.

In at least one implementation, the torque transfer posts 104-1, 104-2 may rotate within the torque transfer sleeves 107-1, 107-2 as the first body attachment 102-1 is rotated relative to the second body attachment 102-2, and vice versa. As the torque transfer posts 104-1, 104-2 are rotated, they may slip along an inside surface of the torque transfer sleeves 107-1, 107-2. Friction between the torque transfer posts 104-1, 104-2 and the inside surface of the torque transfer sleeves 107-1, 107-2 may contribute to the ease or difficulty of operating the compact hinge 100 (i.e., rotating the first body attachment 102-1 relative to the second body attachment 102-2, and vice versa). This friction may be characterized as a friction force dependent on a friction coefficient between the torque transfer posts 104-1, 104-2 and the torque transfer sleeves 107-1, 107-2. A relatively higher friction coefficient may correlate with a higher friction force, and a relatively lower friction coefficient may correlate with a lower friction force.

In some implementations, the friction coefficient may be in a range having an upper value, a lower value, or upper and lower values including any of 0.10, 0.15, 0.16, 0.17, 0.18, 0.19, 0.20, 0.21, 0.22, 0.23, 0.24, 0.25, 0.30 or any value therebetween. For example, the friction coefficient may be greater than 0.10. In another example, the friction coefficient may be less than 0.30. In yet other examples, the friction coefficient may be any value in a range between 0.10 and 0.30. In at least one implementation, it is critical that the friction coefficient be approximately 0.20, which may allow for a friction force that is balanced between too light for the compact hinge 100 to remain open during operating conditions and too strong for a user to conveniently operate the compact hinge 100.

The friction coefficient may be related to the material of the torque transfer posts 104-1, 104-2 and/or the torque transfer sleeves 107-1, 107-2. In at least one implementation, the torque transfer posts 104-1, 104-2 and/or the torque transfer sleeves 107-1, 107-2 may be made from stainless steel. In other implementations, the torque transfer posts 104-1, 104-2 and/or the torque transfer sleeves 107-1, 107-2 may be made from aluminum, aluminum alloys, titanium, titanium alloys, steel, steel alloys, plastic, polymeric compounds, any other material, or combinations of the foregoing. In some implementations, the torque transfer posts 104-1, 104-2 and the torque transfer sleeves 107-1, 107-2 may be made from the same material. In other implementations, the torque transfer posts 104-1, 104-2 and the torque transfer sleeves 107-1, 107-2 may be made from different materials.

In at least one implementation, the first torque transfer post 104-1 may be made from the same material as the second torque transfer post 104-2. In other implementations, the first torque transfer post 104-1 may be made from a different material than the second torque transfer post 104-2. In at least one implementation, the first torque transfer sleeve 107-1 may be made from the same material as the second torque transfer sleeve 107-2. In other implementations, the first torque transfer sleeve 107-1 may be made from a different material than the second torque transfer sleeve 107-2.

The friction force may be related to a compressive or clamping force by the torque transfer sleeves 107-1, 107-2 against the torque transfer posts 104-1, 104-2. The torque transfer posts 104-1, 104-2 may slightly larger in diameter than the central bore through the torque transfer sleeves 107-1, 107-2. When the torque transfer posts 104-1, 104-2 are inserted into the central bore, the torque transfer sleeves 107-1, 107-2 may be stretched around the torque transfer posts 104-1, 104-2. This may cause the torque transfer sleeves 107-1, 107-2 to apply the compressive force against the torque transfer posts 104-1, 104-2. A greater compressive force may increase the friction force. Thus, a first friction force between the first torque transfer sleeve 107-1 and the first torque transfer post 104-1 results in a first torque required to rotate the first torque transfer post 104-1 with respect to the first torque transfer sleeve 107-1. A second friction force between the second torque transfer sleeve 107-2 and the second torque transfer post 104-2 results in a second torque required to rotate the second torque transfer post 104-2 with respect to the second torque transfer sleeve 107-2. A net hinge torque is a combination of the first torque and the second torque. The net hinge torque which may be viewed as the total torque required to operate a single compact hinge 100 (i.e., rotate the first body attachment 102-1 with respect to the second body attachment 102-2, and vice versa).

Increasing one or both of the first friction force and the second friction force may increase one or both of the first torque and the second torque, which may increase the net hinge torque. Increasing the net hinge torque may make it harder to operate the compact hinge 100 (i.e., rotate the first body attachment 102-1 relative to the second body attachment 102-2, and vice versa). Similarly, decreasing one or both of the first friction force and the second friction force may decrease one or both of the first torque and the second torque, which may decrease the net hinge torque. Decreasing the net hinge torque may make it easier to operate the compact hinge (i.e., rotate the first body attachment 102-1 relative to the second body attachment 102-2, and vice versa).

In some implementations, the net hinge torque may be in a range having an upper value, a lower value, or upper and lower values including any of 20 Newton·millimeters (N·mm), 30 N·mm, 40 N·mm, 50 N·mm, 60 N·mm, 70 N·mm, 80 N·mm, 90 N·mm, 100 N·mm, 125 N·mm, 150 N·mm, 175 N·mm, 200 N·mm, or any value therebetween. For example, the net hinge torque may be greater than 20 N·mm. In another example, the net hinge torque may be less than 200 N·mm. In yet other examples, the net hinge torque may be any value in a range between 20 N·mm and 200 N·mm. In at least one implementation, it is critical that the net hinge torque be between 50 and 100 N·mm. This may allow a user to operate the compact hinge (i.e., rotate the first body attachment 102-1 relative to the second body attachment 102-2, and vice versa), with ease, while still allowing the first body attachment 102-1 to remain in the same angular position with respect to the second body attachment 102-2 without support.

In some implementations, a computing device or other device may include a plurality of compact hinges 100. For example, a computing device such as a laptop or a tablet may include two compact hinges 100. In some implementations, each compact hinge 100 of the plurality of compact hinges 100 may have the same net hinge torque. In other implementations, at least two hinges of the plurality of compact hinges may have different net torques. A net device torque may be the combination of the net hinge torques of all the compact hinges 100 on the device. Selecting the net device torque may increase the quality of the experience for a user by balancing opening, maintaining an angular position, and closing the device.

In some implementations, the net device torque may be in a range having an upper value, a lower value, or upper and lower values including any of 50 N·mm, 75 N·mm, 100 N·mm, 125 N·mm, 150 N·mm, 175 N·mm, 200 N·mm, 225 N·mm, 250 N·mm, 275 N·mm, 300 N·mm, 325 N·mm, 350 N·mm, 375 N·mm, 400 N·mm, or any value therebetween. For example, the net device torque may be greater than 50 N·mm. In another example, the net device torque may be less than 400 N·mm. In yet other examples, the net device torque may be any value in a range between 50 N·mm and 400 N·mm. In at least one implementation, it is critical that the net device torque be between 100 N·mm and 200 N·mm. This net device torque may allow a user to rotate portions of the device with ease, while still allowing the device to remain in the same angular position without support. In some implementations, smaller devices may need a smaller net device torque, while larger devices may need a larger net device torque.

In some implementations, a first retainer 124-1 may be connected to the first torque transfer post 104-1, and a second retainer 124-2 may be connected to the second torque transfer post 104-2. The retainers 124-1, 124-2 may include disks, cotter pins, snap rings, other retaining mechanisms, or combinations of the foregoing. The first retainer 124-1 may secure the compressive friction sleeve 106 to the first torque transfer post 104-1, and the second retainer 124-2 may secure the compressive friction sleeve 106 to the second torque transfer post 104-2. The retainers 124-1, 124-2 may be welded, screwed, adhered with an adhesive, or otherwise affixed to the torque transfer posts 104-1, 104-2.

The compact hinge 100 may include a wire bundle 120. Near the compact hinge 100, the wire bundle 120 may make a U-shaped bend 109 oriented toward the compressive friction sleeve 106. The U-shaped bend may include a first bend 111 from a first straight section 105-1, the first straight section 105-1 originating from a display, an input or other electronic component of a computing device. The first bend 111 may bend the wire bundle 120 oriented toward the compressive friction sleeve 106. In this manner, a first length 113 of the wire bundle 120 may be transverse or perpendicular to the compressive friction sleeve 106. In some implementations, the first bend 111 may be approximately 90°. In other implementations, the first bend 111 may be any angle between 30° and 150°.

A second bend 115 may bend the wire bundle 120 oriented along the compressive friction sleeve 106. In at least one implementation, the second bend 115 may bend the wire bundle 120 180° without kinking the wire bundle. In other implementations, the second bend 115 may bend the wire bundle 120 any angle. A second length 117 may extend from the second bend 115 away from the compressive friction sleeve 106. A third bend 119 may bend the wire bundle 120 away from the compact hinge 100. The third bend 119 may direct the wire bundle 120 into a second straight section 105-2. In some implementations, the third bend 119 may be approximately 90°. In other implementations, the third bend 119 may be any angle between 30° and 150°.

In at least one implementation, the U-shaped bend may allow the wire bundle 120 to twist as the compact hinge 100 is operated (i.e., the first body attachment 102-1 rotating relative to the second body attachment 102-2, and vice versa). As the first body attachment 102-1 rotates relative to the second body attachment 102-2, and vice versa, the compressive friction sleeve 106 may remain rigid, and not bend. The wire bundle 120 may be secured to the compressive friction sleeve 106 with a wire housing 125 at the second bend 115. In other words, the second bend 115 may be located in and secured to the wire housing 125, or inside the compact hinge 100. The wire housing 125 may stabilize the wire bundle 120 and keep the wire bundle 120 from moving relative to the compressive friction sleeve 106 as the compact hinge 100 is operated. In other words, there may be no tension or compression on the individual wires of the wire bundle 120 at the second bend 115 during operation of the compact hinge 100. Thus, as the first body attachment 102-1 rotates relative to the second body attachment 102-2, and vice versa, the wire bundle 120 at the second bend 115 may not bend.

To accommodate the motion of the first body attachment 102-1 rotating relative to the second body attachment 102-2, and vice versa, the first length 113 and/or the second length 117 may twist, but not bend, or bend only slightly within the wire housing 125. Twisting of the wire bundle 120 may allow the individual wires of the wire bundle 120 to survive more cycles without degrading, deforming, or breaking. Furthermore, twisting, with no or only a small amount of bend, may prevent the individual wires of the wire bundle 120 from kinking, which may extend the useful life of the wire bundle.

The first length 113 has a first distance 121, and the second length 117 has a second distance 123. In at least one implementation, the first distance 121 and/or the second distance 123 is non-zero. In some implementations, the first distance 121 and/or the second distance 123 may be in a range having an upper value, a lower value, or upper and lower values including any of 0.5 millimeters (mm), 1.0 mm, 1.5 mm, 2.0 mm, 2.5 mm. 3.0 mm, 3.5 mm, 4.0 mm, 4.5 mm, 5.0 mm, 5.5 mm, 6.0 mm, or any value therebetween. For example, the first distance 121 and/or the second distance 123 may be greater than 0.5 mm. In another example, the first distance 121 and/or the second distance 123 may be less than 6.0 mm. In yet other examples, the first distance 121 and/or the second distance 123 may be any value in a range between 0.5 mm and 6.0 mm. In at least one implementation, it may be critical that the first distance 121 and/or the second distance 123 be greater than 2.0 mm to facilitate twisting of the wire bundle 120 within the wire housing 125 without overly stressing or kinking the individual wires of the wire bundle 120. In at least one implementation, the wire bundle 120 may be 39 gauge, 46 gauge, or any other gauge wire bundle 120.

The compact hinge 100 may include a gear set 112 that mechanically connects the first torque transfer post 104-1 to the second torque transfer post 104-2, and therefore the first body attachment 102-1 to the second body attachment 102-2. As part of the gear set 112, each torque transfer post 104-1, 104-2 may include a first gear 114-1, 114-2 located near the outside edge 116 of the body attachment 102-1, 102-2. In at least one implementation, the gears 114-1, 114-2 may be an integral part, or formed as one piece (e.g., single, unitary) with, the torque transfer posts 104-1, 104-2. In other implementations, the gears 114-1, 114-2 may be fabricated separately and rotationally fixed to the torque transfer posts 104-1, 104-2, such as with a mechanical fastener or through a dovetail connection.

The gear set 112 may further include a first transfer gear 118-1 and a second transfer gear 118-2. The transfer gears 118-1, 118-2 may mechanically connect the first gear 114-1 to the second gear 114-2. This may assist the first body attachment 102-1 to rotate relative to the second body attachment 102-2 at with the same angular amount (e.g., at the same rotational rate, in unison, simultaneously, or in concert). For example, when the first body attachment 102-1 is rotated, the first gear 114-1 may rotate. The first gear 114-1 may be mechanically connected to, or geared with, the first transfer gear 118-1 (e.g., the first gear 114-1 and the first transfer gear 118-1 may have matching tooth spacing such that the teeth of the gears interlock, the interlocking teeth causing the first transfer gear 118-1 to rotate when the first gear 114-1 rotates, and vice versa).

Similarly, the first transfer gear 118-1 may be mechanically connected to, or geared with, the second transfer gear 118-2. The second transfer gear 118-2 may be mechanically connected to, or geared with, the second gear 114-2. Thus, through the transfer gears 118-1, 118-2, the first gear 114-1 may be mechanically connected to, or geared with, the second gear 114-2. Thus, when the first torque transfer post 104-1 is rotated, the first gear 114-1 may be rotated. As the first gear 114-1 is rotated, the first transfer gear 118-1 may be rotated. As the first transfer gear 118-1 is rotated, the second transfer gear 118-2 may be rotated. As the second transfer gear 118-2 is rotated, the second gear 114-2 may be rotated. As the second gear 114-2 is rotated, the second torque transfer post 104-2 may be rotated. Because of the geared connections between the gears of the gear set 112, the first gear 114-1 and the second gear 114-2 may rotate at the same angular rotation and/or at the same rotational rate. This may help a device to which the compact hinge 100 is connected to open and close evenly, without sticking or opening and/or closing partially.

In at least one implementation, the gears 114-1, 114-2 and/or the transfer gears 118-1, 118-2 may be made from stainless steel. In other implementations, the gears 114-1, 114-2 and/or the transfer gears 118-1, 118-2 may be made from aluminum, aluminum alloys, titanium, titanium alloys, steel, steel alloys, plastic, polymeric compounds, and any other material. In some implementations, the gears 114-1, 114-2 and the transfer gears 118-1, 118-2 may be made from the same material. In other implementations, the gears 114-1, 114-2 and the transfer gears 118-1, 118-2 may be made from different materials.

The compact hinge 100 is simple, having limited moving parts. The simplicity of the compact hinge 100 makes it low-cost and quick to manufacture and assemble, thereby reducing manufacturing and assembly costs. Further, the simplicity of the compact hinge 100 reduces its size. A smaller hinge size may help to reduce the bezel of an electronic device. Further, a smaller hinge size may enable a reduced electronic device weight, thereby increasing user satisfaction.

Figure 2:
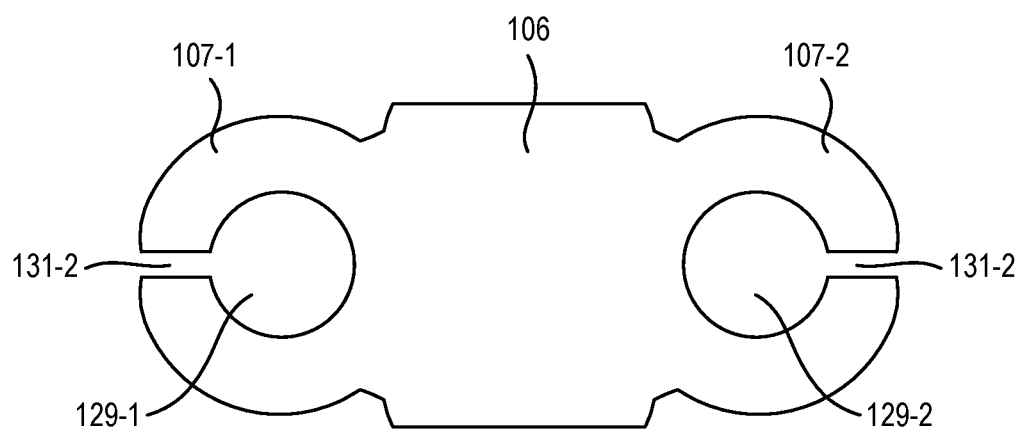
FIG. 2 is a side view of a compressive friction sleeve from FIG. 1, according to at least one implementation of the present disclosure.

FIG. 2 is a side view of the compressive friction sleeve 106 of FIG. 1, according to at least one implementation of the present disclosure. The compressive friction sleeve 106 may include a first torque transfer sleeve 107-1 and a second torque transfer sleeve 107-2. The first torque transfer sleeve 107-1 may include a first central bore 129-1, and the second torque transfer sleeve 107-2 may include a second central bore 129-2. The torque transfer posts (e.g., the torque transfer posts 104-1, 104-2 of FIG. 1) may be inserted into the central bores 129-1, 129-2 of the torque transfer sleeves 107-1, 107-2.

The first torque transfer sleeve 107-1 may include a first expansion slit 131-1 and the second torque transfer sleeve 107-2 may include a second expansion slit 131-2. The expansion slits 131-1, 131-2 may allow for the torque transfer sleeves 107-1, 107-2 to expand and/or contract as the torque transfer posts are inserted, removed, in response to changing conditions, or any combination of the foregoing. For example, a change in temperature of the torque transfer posts may cause the torque transfer posts to expand or contract. This may place a force on the torque transfer sleeves 107-1, 107-2. The expansion slits 131-1, 131-2 may allow the torque transfer sleeves 107-1, 107-2 to expand or contract in response to the forces by the torque transfer posts. In this manner, the friction force may remain constant or approximately constant, despite changing temperature or other conditions.

Figure 3:
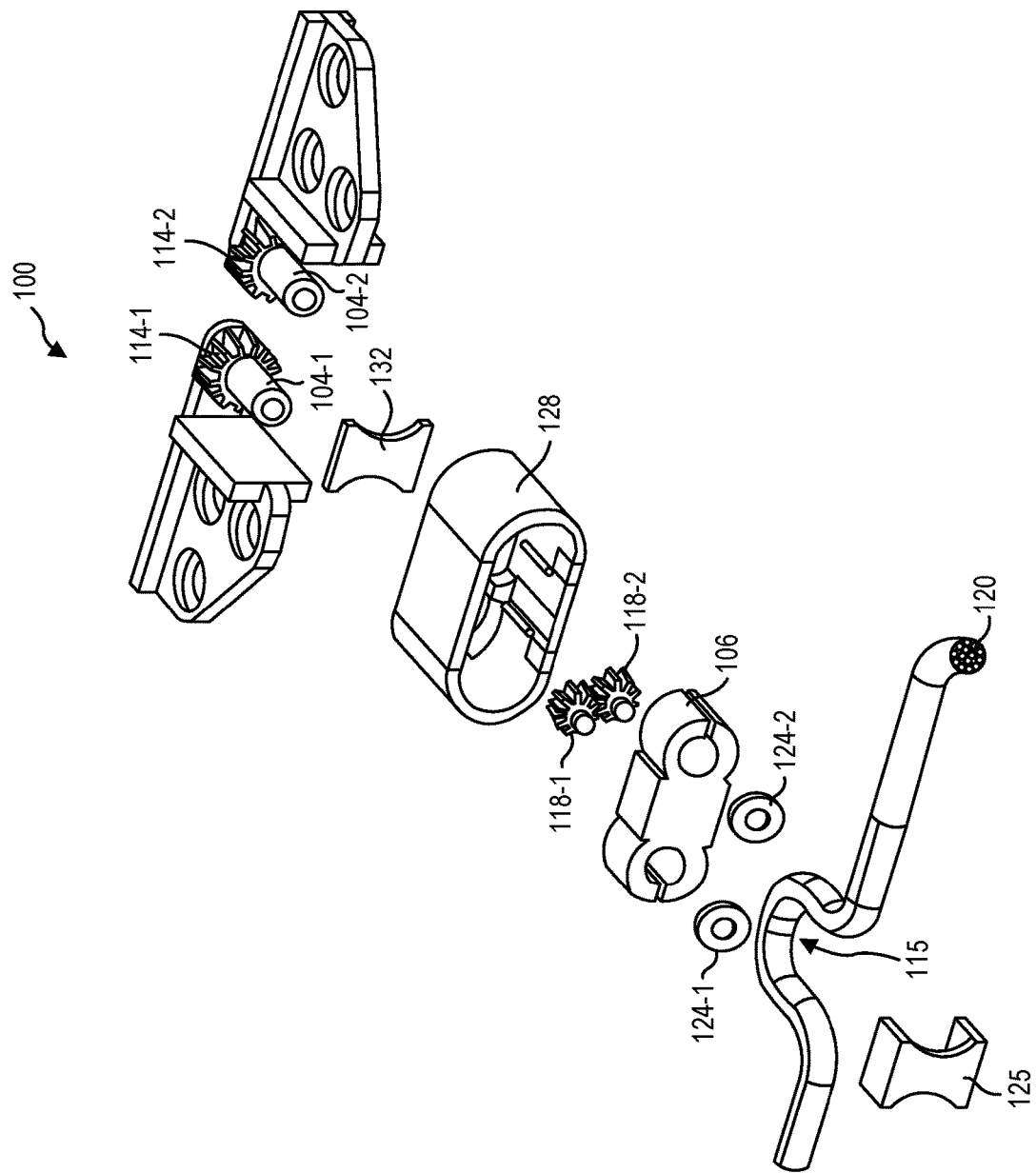
FIG. 3 is an exploded view of the compact hinge of FIG. 1, according to at least one implementation of the present disclosure.

FIG. 3 is an exploded view of the compact hinge 100 of FIG. 1, according to at least one implementation of the present disclosure. The compact hinge 300 may include a cover 128. The cover 128 may enclose one or more parts of the compact hinge 100, including the torque transfer posts 104-1, 104-2, the gears 114-1, 114-2, the transfer gears 118-1, 118-2, the compressive friction sleeve 106, the retainers 124-1, 124-2, the wire housing 125, the second bend 115 of the U-shaped bend in the wire bundle 120, other parts of the wire bundle 120, and any combination of the foregoing. The cover 128 may help to contain and/or protect the elements of the compact hinge 100. For example, the cover 128 may help to contain the wire bundle 120 and prevent the wire bundle 120 from bending at the second bend 115. In at least one implementation, the wire housing 125 may secure the wire bundle 120 to the compressive friction sleeve 106 inside the cover 128.

The cover 128 may further include an outer plate 132. The outer plate 132 and the wire housing 125 may be connected to the cover 128 with a snap fit. Thus, the cover 128 may fully, mostly, or at least partially enclose all or a portion of the compact hinge 100. In this manner the cover 128 may protect the different parts of the compact hinge 100 from damage from impact, dirt infiltration, liquid infiltration, other damage, or combinations of the foregoing. In at least one implementation, the cover 128 may be cosmetic, hiding the elements of the compact hinge 100 from a user.

Figure 4:
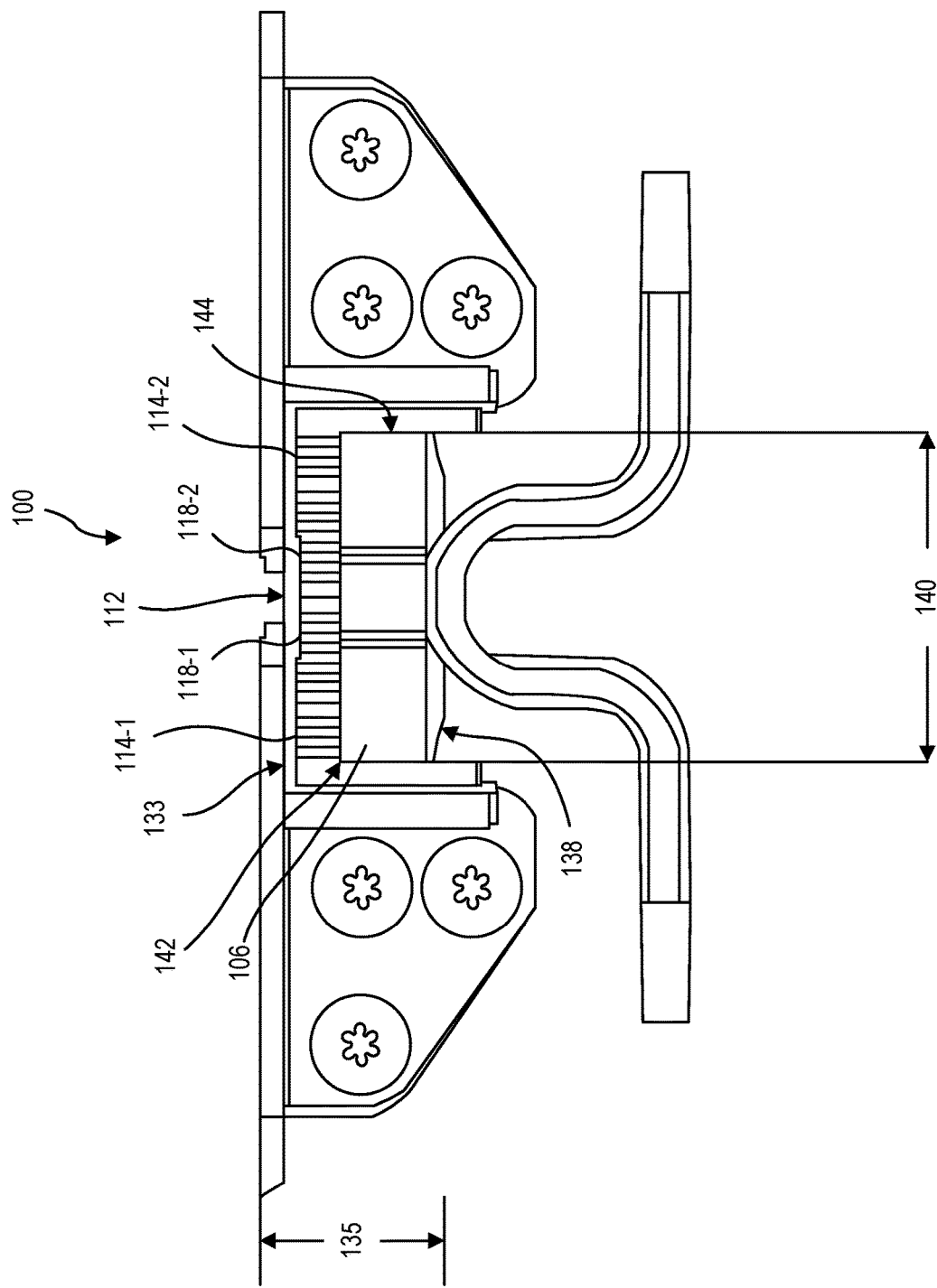
FIG. 4 is a top view of the compact hinge of FIG. 1, according to at least one implementation of the present disclosure.

FIG. 4 is a top-down view of the compact hinge 100 of FIG. 1, according to at least one implementation of the present disclosure. The gear set 112 may include a first gear 114-1, a first transfer gear 118-1, a second transfer gear 118-2, and a second gear 114-2. The first gear 114-1 may be mechanically connected to, or geared with, the first transfer gear 118-1, the first transfer gear 118-1 may be mechanically connected to, or geared with, the second transfer gear 118-2, and the second transfer gear 118-2 may be mechanically connected to, or geared with, the second gear 114-2. Thus, the first gear 114-1 may be mechanically connected to, or geared with, the second gear 114-2 through the transfer gears 118-1, 118-2. In this manner, the first gear 114-1 and the second gear 114-2 may rotate with the same angular rotation and/or at the same angular rate, or, in other words, the gear set 112 may synchronize the rotation of the first gear 114-1 and the second gear 114-2. Thus, as the first body attachment 102-1 is rotated relative to the second body attachment 102-2, the gear set 112 may cause the first body attachment 102-1 and the second body attachment 102-2 to fold with the same angular rotation and/or at the same angular rate. This may prevent one, but onto both, of the first body attachment 102-1 and the second body attachment 102-2 from rotating when a torque is applied. Furthermore, this may prevent the first body attachment 102-1 from rotating more or less than the second body attachment 102-2.

The compact hinge 100 may have a hinge length 135. The hinge length 135 may be the length from an outer edge 133 of the gear set 112 to the far edge 138 of the compressive friction sleeve 106. In some implementations, the hinge length 135 may be in a range having an upper value, a lower value, or upper and lower values including any of 2.0 mm, 2.5 mm, 3.0 mm, 3.5 mm, 4.0 mm, 4.5 mm, 5.0 mm, 5.5 mm, 6.0 mm, 6.5 mm, 7.0 mm, 7.5 mm, 8.0 mm, 8.5 mm, 9.0 mm, 9.5 mm, 10.0 mm, or any value therebetween. For example, the hinge length 135 may be greater than 2.0 mm. In another example, the hinge length 135 may be less than 10.0 mm. In yet other examples, the hinge length 135 may be any value in a range between 2.0 mm and 10.0 mm. In at least one implementation, it is critical that the hinge length 135 be less than 6 mm. This may allow for a reduced bezel of a computing device. A small bezel may increase the total usable display area, increase the usable display area as a percentage of surface area of a portion of an electronic device, decrease the overall device size, decrease the overall device weight, or any combination of the foregoing. In at least one implementation, the bezel may be the same length as the hinge length. In other implementations, the bezel may be greater than the hinge length.

The compact hinge 100 has a hinge width 140. The hinge width 140 may extend from a first outer edge 142 of the compressive friction sleeve 106 to a second outer edge 144 of the compressive friction sleeve. In some implementations, the hinge width 140 may be in a range having an upper value, a lower value, or upper and lower values including any of 2.0 mm, 2.5 mm, 3.0 mm, 3.5 mm, 4.0 mm, 4.5 mm, 5.0 mm, 5.5 mm, 6.0 mm, 6.5 mm, 7.0 mm, 7.5 mm, 8.0 mm, 8.5 mm, 9.0 mm, 9.5 mm, 10.0 mm, or any value therebetween. For example, the hinge width 140 may be greater than 2.0 mm. In another example, the hinge width 140 may be less than 10.0 mm. In yet other examples, the hinge width 140 may be any value in a range between 2.0 mm and 10.0 mm. In at least one implementation, it is critical that the hinge width 140 be less than 6 mm. The hinge width 140 may contribute to a thickness of a device. A smaller hinge width may allow for a thinner device, which may reduce the weight and/or total volume of the device.

Figure 5:
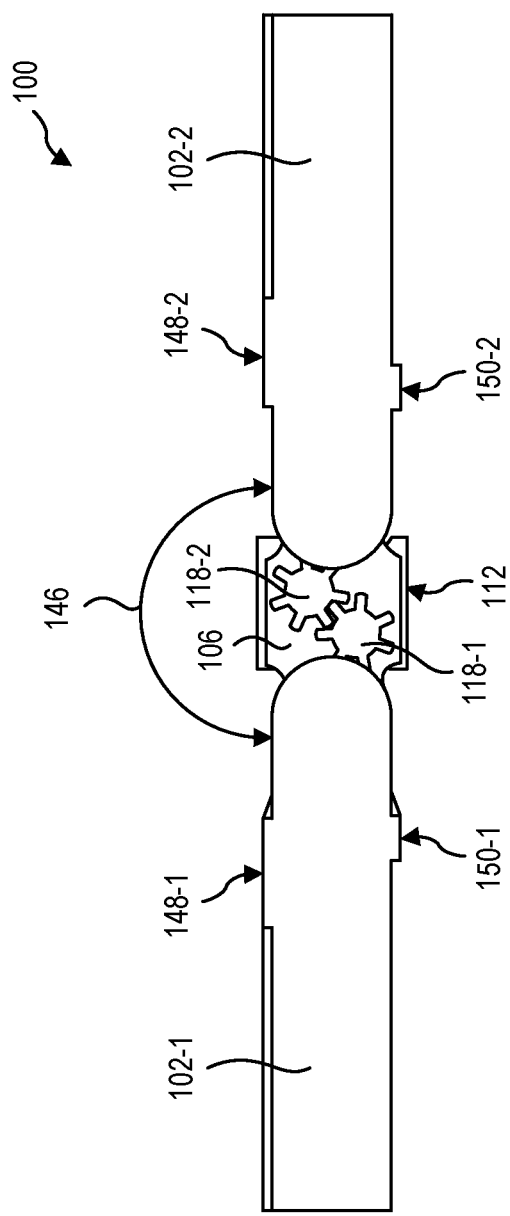
FIG. 5 is a side view of the compact hinge of FIG. 1, according to at least one implementation of the present disclosure.

FIG. 5 is a side view of the compact hinge 100 of FIG. 1, according to at least one implementation of the present disclosure. The first body attachment 102-1 and the second body attachment 102-2 may be connected to the compressive friction sleeve 106. A gear set 112 may cause the first body attachment 102-1 and the second body attachment 102-2 to rotate by the same amount when a torque is applied to one or both of the first body attachment 102-1 and the second body attachment 102-2. The gear set may include transfer gears 118-1, 118-2 that synchronize the rotation of the first body attachment 102-1 and the second body attachment 102-2. The transfer gears 118-1, 118-2 may be connected to the compressive friction sleeve 106. In at least one implementation, the transfer gears 118-1, 118-2 may be inserted into a pocket in the compressive friction sleeve.

The first body attachment 102-1 and the second body attachment 102-2 may each have an individual angle of rotation. The individual angle of rotation may be the maximum amount that the body attachment 102-1, 102-2 may be able to rotate relative to the compressive friction sleeve (e.g., compressive friction sleeve 106 of FIG. 1). In some implementations, the individual angle of rotation may be any angle between 0° and 360°. In at least one implementation, it may be critical that the individual angle of rotation be greater than 180°. This may allow the body attachment 102-1, 102-2 to be rotated from face-down to face-up.

The combination of individual angles of rotation from the first body attachment 102-1 and the second body attachment 102-2 may contribute to a hinge angle 146. The hinge angle 146 may be measured between a first primary face 148-1 of the first body attachment 102-1 and a second primary face 148-2 of the second body attachment 102-2. The hinge angle 146 may range between 0° and 360°. At a hinge angle 146 of 0°, the first primary face 148-1 may contact or be parallel to the second primary face 148-2. At a hinge angle 146 of 360°, a first secondary face 150-1 of the first body attachment 102-1 may contact or be parallel to a second secondary face 150-2 of the second body attachment 102-2. To achieve a 360° hinge angle 146, each individual angle of rotation must be at least 180°. Thus, the hinge angle 146 may facilitate a device being opened into any configuration from fully closed (e.g., a hinge angle 146 of 0°) to fully open (e.g., a hinge angle of 360°). In at least one implementation, because the first body attachment 102-1 and the second body attachment 102-2 rotate with the same angular amount, then a change in the hinge angle 146 of 180° may be made by rotating each of the first body attachment 102-1 and the second body attachment 102-2 through 90°.

Figure 6:
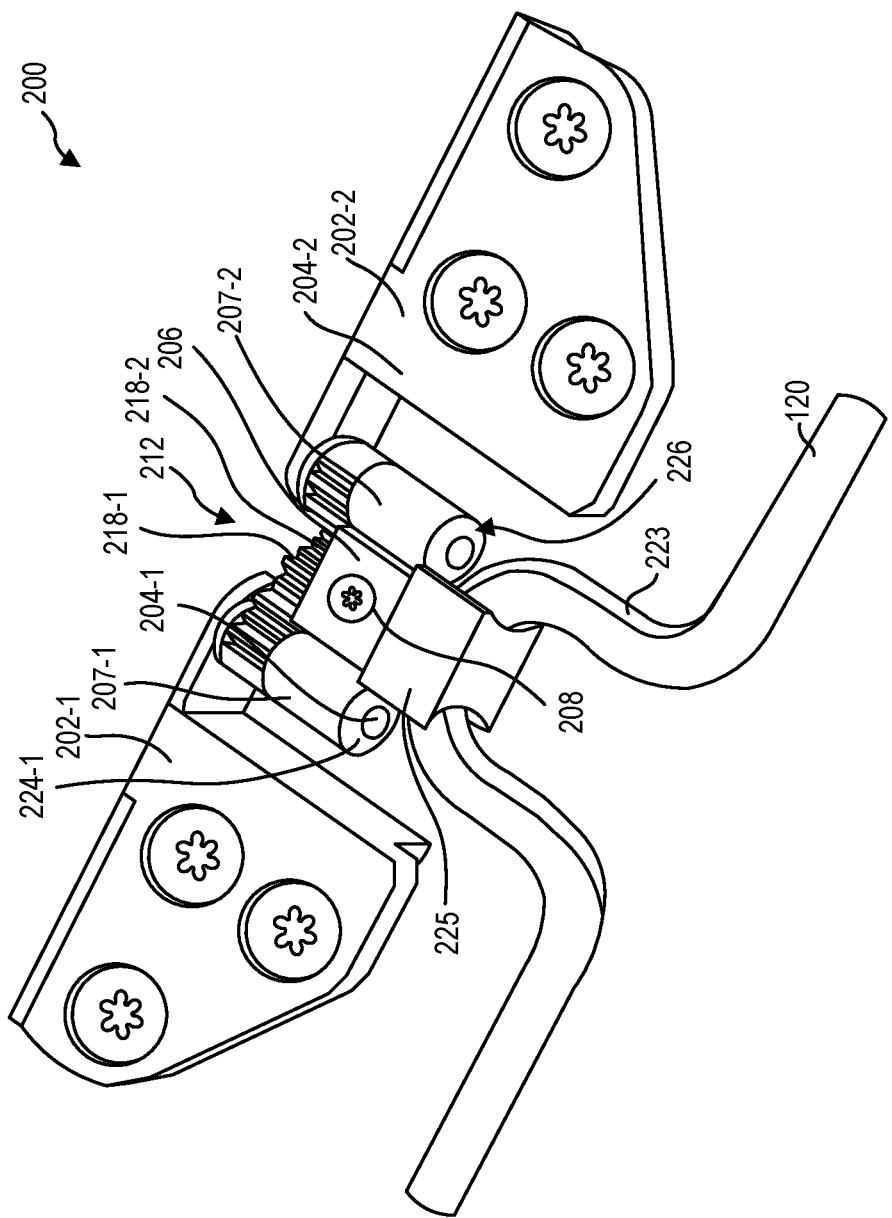
FIG. 6 is a perspective view of another compact hinge, according to at least one implementation of the present disclosure.

FIG. 6 is a representation of a compact hinge 200, according to at least one implementation of the present disclosure. The compact hinge 200 may include at least some of the same features and elements of the compact hinge 100 of FIG. 1 through FIG. 5. The compact hinge 200 may include a compressive friction sleeve 206 with a first torque transfer sleeve 207-1 and a second torque transfer sleeve 207-2. A first torque transfer post 204-1 may be inserted into the first torque transfer sleeve 207-1 and a second torque transfer post 204-2 may be inserted into the second torque transfer sleeve 207-2. The torque transfer sleeves 207-1, 207-2 may clamp around the torque transfer posts 204-1, 204-2. A friction force required to rotate the torque transfer posts 204-1, 204-2 may be dependent upon a coefficient of friction and a pressure or force with which the torque transfer sleeves 207-1, 207-2 clamp down on the torque transfer posts.

The first torque transfer post 204-1 may be connected to or integrally formed with a first body attachment 202-1. Similarly, the second torque transfer post 204-2 may be connected to or integrally formed with a second body attachment 202-2. A gear set 212 may be connected to the first torque transfer post 204-1 and the second torque transfer post 204-2. The gear set 212 may be geared such that, as the first body attachment 202-1 is rotated with respect to the second body attachment 202-2, the first body attachment 202-1 and the second body attachment 202-2 rotate with the same rotational amount and/or the same rotational angle.

A torque adjustment screw 208 may be inserted into the compressive friction sleeve 206. As the torque adjustment screw 208 is tightened, at least one of the first torque transfer sleeve 207-1 and the second torque transfer sleeve 207-2 may clamp down harder, or increase the compressive force, on the respective first torque transfer post 204-1 or second torque transfer post 204-2. This may increase the first torque required to rotate the first torque transfer post 204-1 with respect to the first torque transfer sleeve 207-1, and/or increase the second torque required to rotate the second torque transfer post 204-2 with respect to the second torque transfer sleeve 207-2. Increasing the first torque and/or the second torque may increase the net hinge torque. Thus, by tightening the torque adjustment screw 208, the net hinge torque may be increased.

Similarly, as the torque adjustment screw 208 is loosened, at least one of the first torque transfer sleeve 207-1 or the second torque transfer sleeve 207-2 may clamp down less hard, or decrease the compressive force, on the respective first torque transfer post 204-1 or second torque transfer post 204-2. This may decrease the first torque required to rotate the first torque transfer post 204-1 with respect to the first torque transfer sleeve 207-1, and/or decrease the second torque required to rotate the second torque transfer post 204-2 with respect to the second torque transfer sleeve 207-2. Thus, by loosening the torque adjustment screw 208, the net hinge torque may be decreased.

Therefore, by adjusting the extent of the insertion or threading of the torque adjustment screw 208 into the compressive friction sleeve 206, the net hinge torque required to rotate the first body attachment 202-1 with respect to the second body attachment 202-2 may be increased or decreased to reach a desired net hinge torque. In at least one implementation, the torque adjustment screw 208 may be adjusted in the factory to a pre-set depth or rotation. In the same or other implementations, the torque adjustment screw 208 may be adjusted by a user or a technician after a computing device has been assembled. Thus, the user or the technician may customize the net hinge torque to the user's preferences and/or to adjust for changing conditions (e.g., a loosening of the torque adjustment screw, change in average temperature or humidity).

By having a customizable net hinge torque, a standard net device torque may be set for a given model or set of computing devices. It may be easier or more reliable to set the net device torque using the torque adjustment screw 208. Thus, the variation in net device torque across devices may be lower. In some implementations, customizing the net hinge torque may reduce manufacturing costs by allowing the compressive friction sleeve 206, the torque transfer posts 204-1, 204-2, other components, and combinations of the foregoing, to be manufactured with looser tolerances, because the net hinge and/or device torque may be customized to the standard net device torque using the torque adjustment screw 208.

Figure 7:
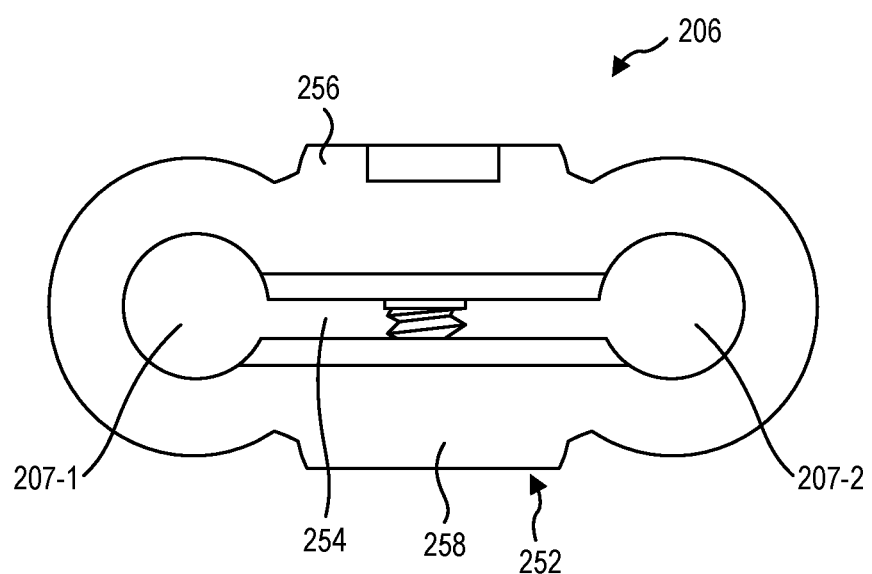
FIG. 7 is a side view of another compressive friction sleeve from FIG. 6, according to at least one implementation of the present disclosure.

FIG. 7 is a side-view of the compressive friction sleeve 206 of FIG. 6, according to at least one implementation of the present disclosure. The compressive friction sleeve 206 may include a first torque transfer sleeve 207-1 and a second torque transfer sleeve 207-2. A connector 252 may connect the first torque transfer sleeve 207-1 to the second torque transfer sleeve 207-2.

The connector 252 may include a gap 254 that separates the connector 252 into a first connector side 256 and a second connector side 258. A torque adjustment screw 208 may be inserted and/or threaded into the compressive friction sleeve 206 at the connector 252. A bore (not shown) may extend through the first connector side 256 and into the second connector side 258 along a common axis. The torque adjustment screw 208 may be inserted into the bore through the first connector side 256 and into the second connector side 258. In at least one implementation, the bore in the second connector side 258 may be threaded. In the same or other implementations, the bore through the first connector side 256 may be smooth-walled or threaded.

As the torque adjustment screw 208 is threaded into the second connector side 258, it may pull the first connector side 256 and the second connector side 258 together. This may cause the gap 254 to become smaller. This in turn may reduce the inner diameter of one or both of the first torque transfer sleeve 207-1 and the second torque transfer sleeve 207-2. If the torque transfer posts (e.g., torque transfer posts 204-1, 204-2) are inserted into the torque transfer sleeves 207-1, 207-2, then one or both of the first torque transfer sleeve 207-1 and the second torque transfer sleeve 207-2 may clamp down harder on the torque transfer posts as the torque adjustment screw 208 is tightened. This may increase the torque required to rotate the torque transfer posts in the torque transfer sleeves 207-1, 207-2. This in turn may increase the net hinge torque. Similarly, as the torque adjustment screw 208 is removed from the second connector side 258, the first connector side 256 and the second connector side 258 may expand away from each other. This may loosen the clamping force on the torque transfer posts, which may reduce the net hinge torque. Thus, by tightening and/or loosening the torque adjustment screw 208, the net hinge torque may be adjusted.

In some implementations, the torque adjustment screw 208 may be inserted into the compressive friction sleeve 206 with an extent of insertion. The extent of the insertion may be positively related to the clamping force on at least one of the first torque transfer post 204-1 and the second torque transfer post 204-2 by the compressive friction sleeve 206. This in turn may be positively related to the net hinge torque of the compact hinge 100. Thus, as the extent of insertion is increased, the clamping force and the net hinge torque are increased. Similarly, as the extent of insertion is decreased, the clamping force and the net hinge torque are decreased.

Figure 8:
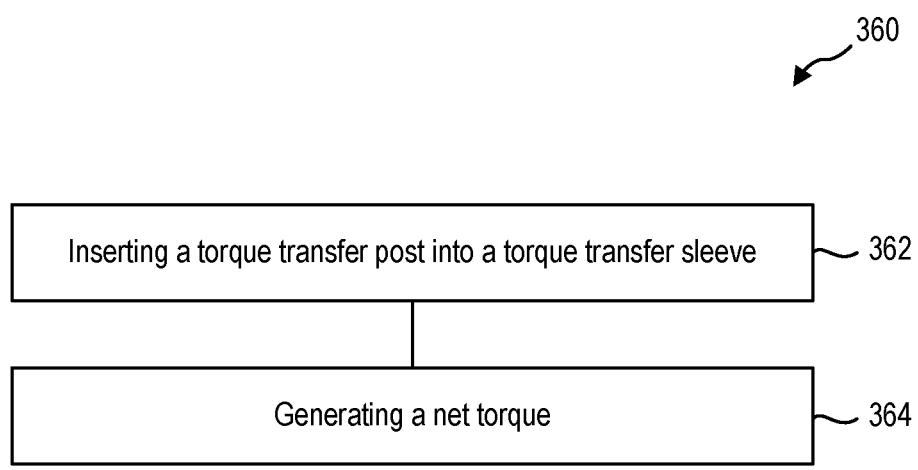
FIG. 8 is a method chart of a method for operating a compact hinge, according to at least one implementation of the present disclosure.

FIG. 8 is a method chart of a method 360 for operating a compact hinge, according to at least one implementation of the present disclosure. The method 360 may include inserting a first torque transfer post into a first torque transfer sleeve and a second torque transfer post into a second torque transfer sleeve at 362. The method 360 may further include generating a net torque by rotating the first torque transfer post in the first torque transfer sleeve with a first torque and rotating the second torque transfer post in the second torque transfer sleeve with a second torque, the first torque and the second torque creating the net torque at 364.

In at least one implementation, rotating the first torque transfer post may further include rotating a first gear connected to the first torque transfer post. Rotating the first gear may rotate a first transfer gear mechanically connected to the first gear. The first transfer gear may rotate a second transfer gear and the second transfer gear may rotate a second gear connected to the second torque transfer post. In other words, rotating the first torque transfer post may rotate the second torque transfer post by a similar or the same amount.

The method may further include twisting, but not bending or bending very little, a length of a wire bundle as the first torque transfer post is rotated. In this manner, rotating the first torque transfer post and/or the second torque transfer post may not kink the wire bundle.

Figure 9:
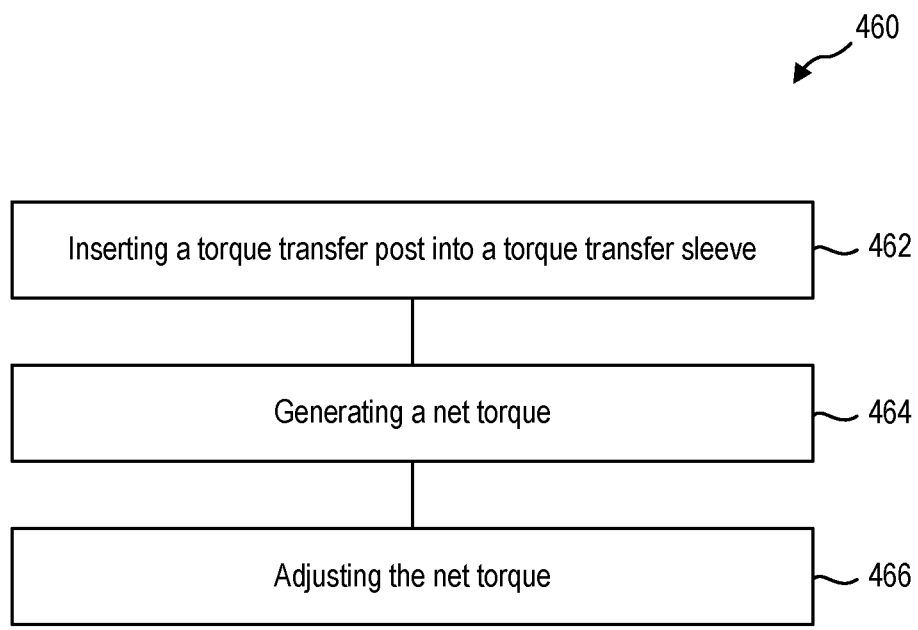
FIG. 9 is a method chart of another method for operating a compact hinge, according to at least one implementation of the present disclosure.

FIG. 9 is a method chart of a method 460 for operating a compact hinge, according to at least one implementation of the present disclosure. The method 460 may include inserting a first torque transfer post into a first torque transfer sleeve and a second torque transfer post into a second torque transfer sleeve at 462. The method 460 may further include generating a net torque by rotating the first torque transfer post in the first torque transfer sleeve with a first torque and rotating the second torque transfer post in the second torque transfer sleeve with a second torque, the first torque and the second torque creating the net torque at 464.

The method 460 may further include adjusting the net torque by changing the tightness of a torque adjustment screw threaded into the compressive friction sleeve. Tightening the torque adjustment screw may increase the net torque, and loosening the torque adjustment screw may decrease the net torque.

Figure 10:
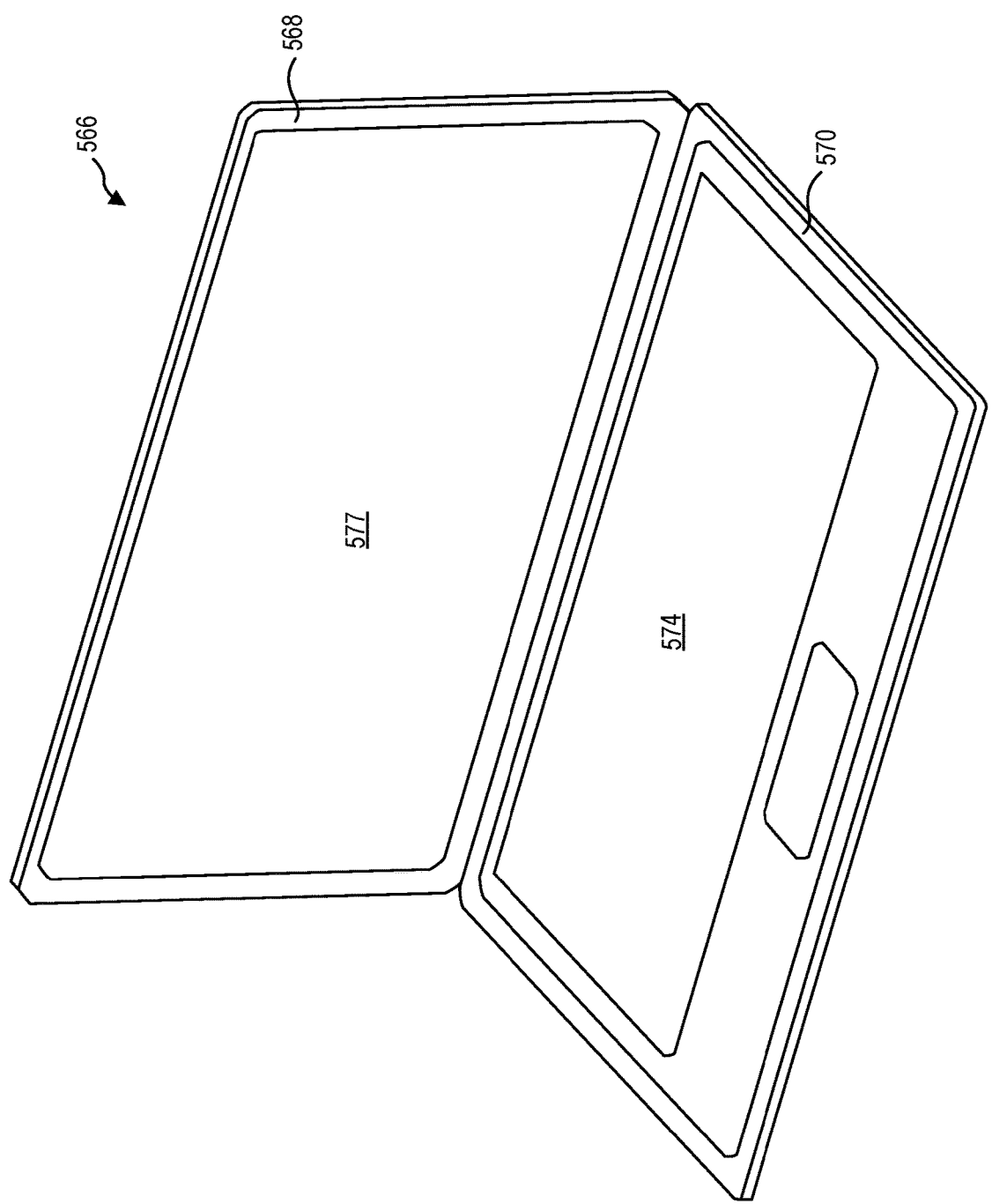
FIG. 10 is a perspective view of a computing device, according to at least one implementation of the present disclosure.

FIG. 10 is a perspective view of a computing device 566, according to at least one implementation of the present disclosure. The computing device 566 may refer to various types of computing devices. For example, the computing device 566 may include a mobile device such as a mobile telephone, a smartphone, a personal digital assistant (PDA), a tablet, or a laptop. Additionally, or alternatively, the computing device 566 may include a non-mobile device such as a desktop computer, server device, or other non-portable device.

The computing device 566 may include a first portion 568 and a second portion 570. The first portion 568 may include a display 572. For example, the display may be any display used on a computing device, including an LCD, LED, OLED, cathode ray tube, touch sensitive display, and so forth. The second portion 570 may include an input device 574, such as a keyboard, track pad, roller ball, button, touch sensitive display, or any other input device.

The computing device 566 may include at least one compact hinge (not shown). The compact hinge may include at least some of the same characteristics and features as the compact hinges discussed in reference to FIG. 1 through FIG. 7. For example, the compact hinge may include a first body attachment (e.g., first body attachment 102-1 of FIG. 1) that is connected to the first portion 568. The compact hinge may include a second body attachment (e.g., second body attachment 102-2) that is connected to the second portion 570. The first portion 568 may therefore be rotated relative to the second portion 570 about the compact hinge.

The articles "a," "an," and "the" are intended to mean that there are one or more of the elements in the preceding descriptions. The terms "comprising," "including," and "having" are intended to be inclusive and mean that there may be additional elements other than the listed elements.

Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A compact hinge, comprising:
   a first body attachment and a second body attachment;
   a first torque transfer post connected to the first body attachment and a second torque transfer post connected to the second body attachment; and
   a compressive friction sleeve including a first torque transfer sleeve and a second torque transfer sleeve, wherein the first torque transfer post is inserted into the first torque transfer sleeve and the second torque transfer post is inserted into the second torque transfer sleeve.

2. The compact hinge of claim 1, further comprising a torque adjustment screw inserted into the compressive friction sleeve configured to adjust the torque transferred both from the first torque transfer sleeve to the first torque transfer post and from the second torque transfer sleeve to the second torque transfer post.

3. The compact hinge of claim 2, wherein an extent to which the torque adjustment screw is inserted into the compressive friction sleeve is positively related to a net hinge torque to rotate the first body attachment with respect to the second body attachment.

4. The compact hinge of claim 1, further comprising a wire bundle, wherein the wire bundle includes a U-shaped bend oriented toward the compressive friction sleeve.

5. The compact hinge of claim 4, wherein the wire bundle includes a first bend oriented toward the compressive friction sleeve and a second bend oriented along the compressive friction sleeve, and wherein a distance between the first bend and the second bend is non-zero.

6. The compact hinge of claim 5, wherein the distance is greater than 2 millimeters.

7. The compact hinge of claim 1, the first torque transfer sleeve and the second torque transfer sleeve including an expansion slit.

8. The compact hinge of claim 1, further comprising a gear set mechanically connecting the first torque transfer post to the second torque transfer post.

9. The compact hinge of claim 8, wherein the gear set includes:
  a first gear connected to the first torque transfer post;
  second gear connected to the second torque transfer post;
  a first transfer gear mechanically connected to the first gear; and
  a second transfer gear mechanically connected to the first transfer gear and the second gear.

10. The compact hinge of claim 1, further comprising a first retainer connected to the first torque transfer post and a second retainer connected to the second torque transfer post, the first retainer securing the compressive friction sleeve to the first torque transfer post and the second retainer securing the compressive friction sleeve to the second torque transfer post.

11. The compact hinge of claim 1, further comprising a cover, wherein the cover encloses the first torque transfer post, the second torque transfer post, and the compressive friction sleeve.

12. A method for operating a compact hinge, comprising:
  inserting a first torque transfer post into a first torque transfer sleeve of a compressive friction sleeve and a second torque transfer post into a second torque transfer sleeve; and
  generating a net torque by rotating the first torque transfer post in the first torque transfer sleeve with a first torque and rotating the second torque transfer post in the second torque transfer sleeve with a second torque, the first torque and the second torque creating the net torque.

13. The method of claim 12, further comprising adjusting the net torque by changing a tightness of a torque adjustment screw threaded into the compressive friction sleeve.

14. The method of claim 13, wherein tightening the torque adjustment screw increases the net torque.

15. The method of claim 13, wherein loosening the torque adjustment screw decreases the net torque.

16. The method of claim 12, wherein rotating the first torque transfer post includes rotating a first gear connected to the first torque transfer post, wherein rotating the first gear rotates a first transfer gear, and rotating the first transfer gear rotates a second transfer gear, and rotating a second transfer rotates a second gear connected to the second torque transfer post.

17. The method of claim 12, further comprising twisting a wire bundle along a distance between a first bend and a second bend in the wire bundle.

18. The method of claim 12, wherein rotating the first torque transfer post and rotating the second torque transfer post does not kink a wire bundle.

19. A computing device, comprising:
  a first portion including a display;
  a second portion;
  a first body attachment connected to the first portion, the first body attachment including:
    a first torque transfer post;
    a first gear integrally formed with the first torque transfer post;
  a second body attachment connected to the second portion, the second body attachment including:
    a second torque transfer post;
    a second gear integrally formed with the second torque transfer post;
  a compressive friction sleeve, the compressive friction sleeve including:
    a first torque transfer sleeve, the first torque transfer post being inserted into the first torque transfer sleeve;
    a second torque transfer sleeve, the second torque transfer post being inserted into the second torque transfer sleeve;
  a first transfer gear mechanically connected to the first gear; and
  a second transfer gear mechanically connected to the first transfer gear and the second gear.

20. The computing device of claim 19, wherein the compressive friction sleeve includes a bore through a connector connecting the first torque transfer sleeve to the second torque transfer sleeve, and further comprising a torque adjustment screw threaded into the bore.

21. The compact hinge of claim 1, wherein the compression friction sleeve is configured to apply torque to the first torque transfer post through the first torque transfer sleeve and to apply torque to the second torque transfer post through the second torque transfer sleeve.

22. The method of claim 12, wherein inserting a first torque transfer post into a first torque transfer sleeve of a compressive friction sleeve and a second torque transfer post into a second torque transfer sleeve is to apply torque to the first torque transfer post through the first torque transfer sleeve and to apply torque to the second torque transfer post through the second torque transfer sleeve.

23. The computing device of claim 19, wherein the compression friction sleeve is configured to apply torque to the first torque transfer post through the first torque transfer sleeve and to apply torque to the second torque transfer post through the second torque transfer sleeve.

* * * * *